United States Patent [19]

Hollingsworth et al.

[11] 4,107,996
[45] Aug. 22, 1978

[54] PRESSURE GAUGE

[75] Inventors: Ashley J. Hollingsworth, Atherton; Ralph B. Shamlian, San Francisco, both of Calif.

[73] Assignee: Farallon Industries, Inc., Belmont, Calif.

[21] Appl. No.: 636,045

[22] Filed: Nov. 28, 1975

[51] Int. Cl.² .................. G01F 23/14; G01L 7/08
[52] U.S. Cl. ........................... 73/300; 73/715
[58] Field of Search .............. 73/300, 396, 406, 408, 73/432 A, 715

[56] References Cited

U.S. PATENT DOCUMENTS

| 879,039 | 2/1908 | Dixon | 73/408 |
|---|---|---|---|
| 1,018,582 | 2/1912 | Nelson | 73/396 |
| 1,960,466 | 5/1934 | Thrall | 73/408 X |
| 2,472,019 | 5/1949 | Kinderman | 73/432 A UX |
| 2,848,973 | 8/1958 | Stiens | 73/396 X |
| 2,935,873 | 5/1960 | Stewart | 73/300 |
| 2,986,038 | 5/1961 | Cerny | 73/406 |
| 3,831,449 | 8/1974 | MacNeil et al. | 73/300 |
| 3,949,610 | 4/1976 | Pietsch | 73/406 |
| 3,990,306 | 11/1976 | Denis | 73/300 |
| 3,996,881 | 12/1976 | Schneider | 73/431 X |

OTHER PUBLICATIONS

Bellofram ® Rolling Diaphragms & Basic Description, Specific Advantages, Typical Applications; Bellofram Corp.

Primary Examiner—Donald O. Woodiel
Attorney, Agent, or Firm—Lowhurst & Aine

[57] ABSTRACT

A gauge for measuring pressure is described having a casing, a transparent lens, a faceplate bearing indicia and indices, a primary depth pointer, a maximum depth pointer, and a rack-and-pinion gear assembly for moving the pointers relative to the indicia and the indices. In the rack-and-pinion gear assembly there is provided a spring-biased rack, a pinion gear and a flexible diaphragm. The pinion gear is mounted on a shaft supporting the primary depth pointer. The rack is threadably coupled to the gear and adapted to be moved linearly for turning the gear and the shaft. The diaphragm is mounted in a selected manner in a bore in the casing in contact with one end of the rack. The opposite end of the rack is in contact with a spring. A change in ambient pressure relative to the pressure within the casing moves the diaphragm and rack against the spring and rotates the pointers. The maximum pressure indiciator, which is driven by the primary depth pointer, is provided for indicating maximum pressure.

10 Claims, 6 Drawing Figures

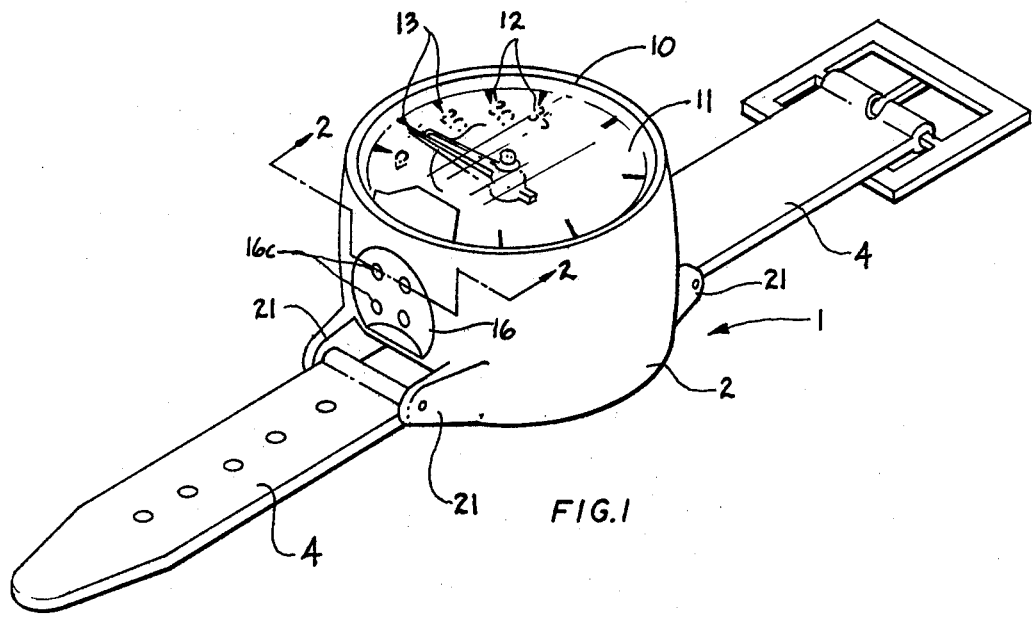
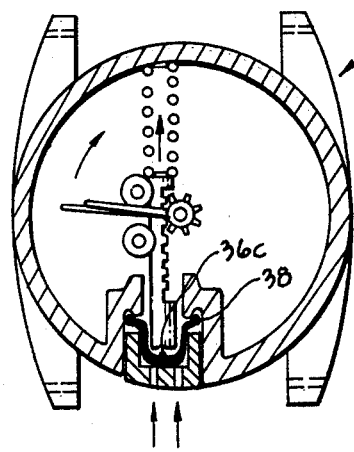
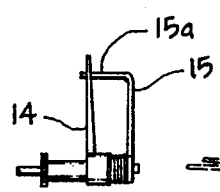
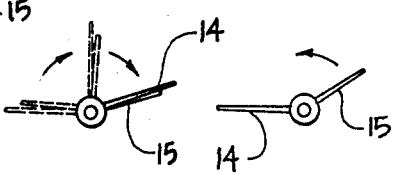

PRESSURE GAUGE

BACKGROUND OF THE INVENTION

The present invention relates to pressure measuring apparatus in general and in particular to a novel, portable, reliable, rugged and inexpensive water pressure gauge for measuring depth of water or altitude in air. Gauges of the type described are frequently used in relatively deep submarine work by divers for indicating the depth of water at which the divers are working. Such gauges are also widely used by recreational divers.

Generally, the gauges used heretofore in diving employ an aneroid mechanism or conventional Bourdon tube with suitable linkage and an indicator calibrated to provide a display of depth in feet or meters as a function of ambient water pressure. Typical of the gauges of these types are the gauges described in U.S. Pat. Nos. 3,693,446; 3,828,611 and 3,203,244.

Bourdon type gauges are quite accurate and widely used but are relatively expensive to manufacture to achieve the same precision of spring rate as that obtained with a common spring.

The internal mechanism in the Bourdon gauges is also relatively delicate and, therefore, care must be taken to insure that they are not unduly subjected to shocks or external loads. For example, Bourdon tube-driven needles in depth gauges are severely affected by even the slightest resistance of a secondary needle, such as the maximum depth indicator. Indeed, a secondary needle can cause the primary depth needle to read typically 3% lower than it would in the absence of the secondary needle.

For these reasons, it is desirable to have a gauge with a maximum depth indicator which is portable, relatively accurate over a wide range of water depths, rugged, reliable and relatively inexpensive.

SUMMARY OF THE INVENTION

In view of the foregoing, a principal object of the present invention is a pressure gauge which is relatively accurate, rugged, reliable and inexpensive.

Another object is a gauge of the type described for measuring water and air pressures.

More specifically, a principal object of the invention is a portable pressure gauge for use by a diver for measuring the depth of water.

Another object is a gauge of the above described type having a maximum pressure or depth indicator.

In accordance with the above objects, a principal feature of a gauge according to the present invention is a rack-and-pinion gear assembly. In the assembly there is provided a rack member and a gear member. The gear member is fitted to a shaft supporting a pointer above a faceplate bearing indicia and indices for relating water depths. The rack is mounted in tooth engagement with the gear. One end of the rack extends into a bore which is provided through a wall of a casing forming a chamber for enclosing the moving parts. The opposite end of the rack is coupled to a spring.

A flexible diaphragm is provided in the bore in contact with the rack and is movable in response to a pressure differential between the ambient and internal gauge pressure. A movement of the diaphragm causes a corresponding movement of the rack against the spring member. A movement of the rack causes a rotation of the gear and a corresponding rotation of the pointer relative to the indicia and indices on the faceplate. Coupled for movement with the pointer is a maximum depth indicator which is resettable using a magnet or the like.

Among the advantages of the rack-and-pinion gear assembly, in addition to its relatively low cost of manufacture and other advantages, is a long stroke for providing ruggedness, amplification and accuracy, no inertia or shock problems and a minimum sensitivity to friction because of the high forces employed in its operation.

DESCRIPTION OF THE DRAWINGS

The above and other objects, features and advantages of the invention will become apparent in the following detailed description of the accompanying drawings in which:

FIG. 1 is a perspective view of a gauge according to the present invention.

FIG. 2 is a cross-sectional view taken along the lines 2—2 of FIG. 1.

FIG. 3 is an elevation view of the pointers and gear of FIG. 2.

FIGS. 4 and 5 are plan views of two relative positions of the pointers of FIG. 3.

DETAILED DESCRIPTION

Figure 6:
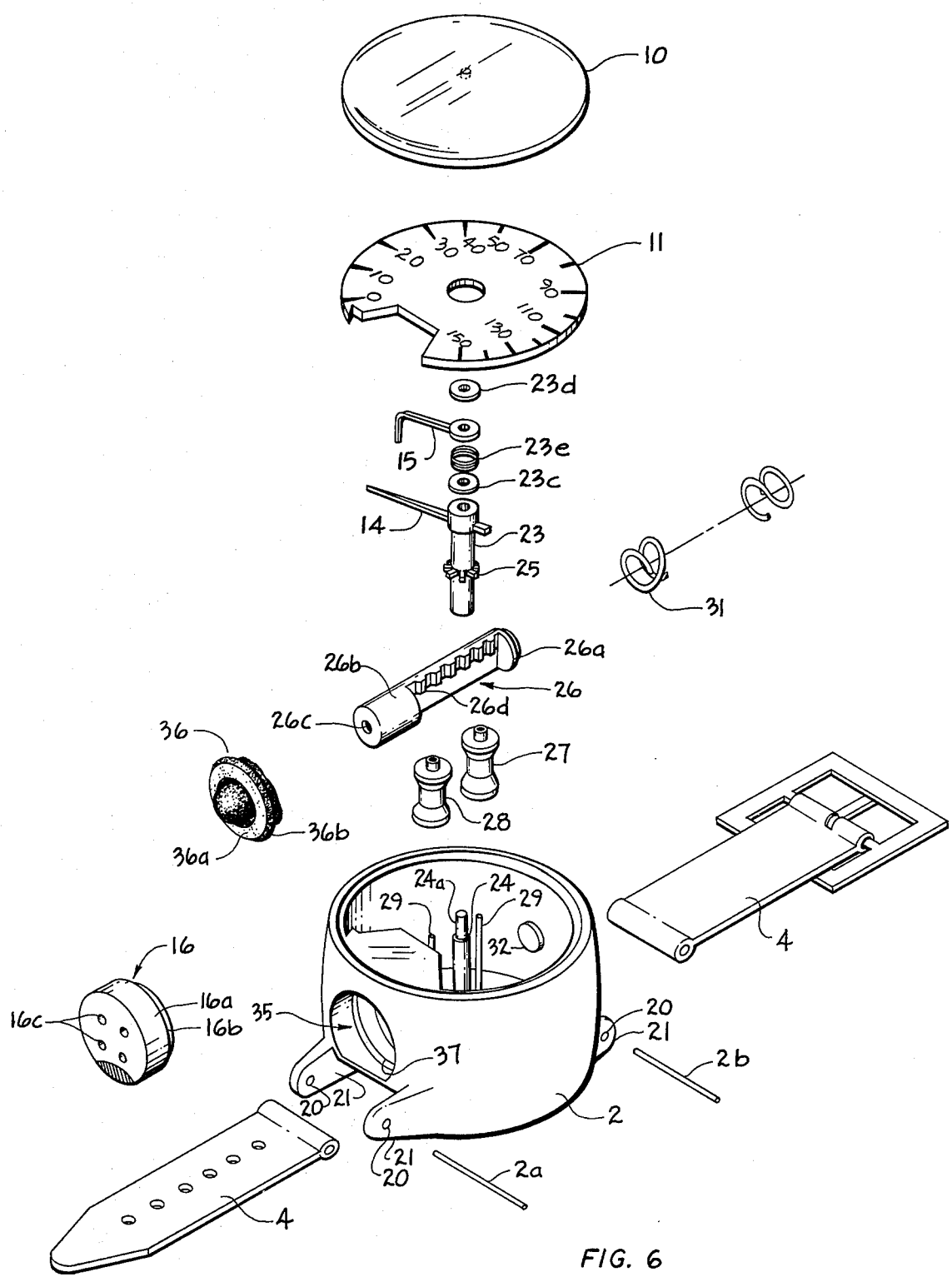
FIG. 6 is an exploded view of the gauge of FIG. 1.

Referring to FIG. 1, there is provided in accordance with the present invention, a water pressure or depth gauge 1. Gauge 1 has a rigid housing or case 2 typically made of a nonwater-corrosive material, such as a plastic. The bottom of case 2 is provided with a contoured surface for fitting comfortably on the top of a diver's wrist or on the wristband portion of a diver's wet suit or the like. Extending from opposite sides of the case 2 are two pairs of attachment fittings 21. Coupled to the fittings 21, as by wrist pins, not shown, is a wristband 4. At the top of the case 2 and sealed in a watertight manner thereto is a rigid transparent lens 10. Beneath the lens 10 is a faceplate 11. About the edge of faceplate 11 is a plurality of equidistantly spaced indicia 12 and indices 13. The indicia are typically numerals for desigated depth of water in convenient units of measurement, such as feet or meters. The indices are to two types. The first type is a triangularly shaped bold mark, such as that adjacent the numerals 10, 20, etc., and the second type is a short straight line. The surface of the plate 11 is generally luninescent and of a light cream or beige color and the indicia and indices are of a contrasting color, such as black. Pivotably mounted for rotation about the axis of the faceplate 11 and relative to the indicia and indices 12 and 13 is a primary depth pointer or needle 14 and a secondary or maximum depth indicator, pointer or needle 15. In a wall of the case 2, above one of the wristbands 4, as will be further described, is a bore for receiving an insert 16. In insert 16, there is provided a plurality of holes 16c. Holes 16c are provided for admitting water.

Referring to FIGS. 2-6, the wristbands 4, shown in FIG. 1, are connected to the case 2 by wrist pins 2a and 2b, which are adapted for removable insertion in a hole 20 in each of the pair of band lugs or attachment fittings 21, which extend from the opposite sides of the bottom of the case 2. In the interior of the case 2, the pointer 14 is supported on the end of a hollow shaft 23. Shaft 23 is rotatably mounted on a pin 24 extending from the bottom of the interior of the case 2. Attached to the shaft 23, or formed as an integral part thereof, is a pinion gear 25. Gear 25 is threadably coupled to a toothed rack 26, which is supported and retained in engagement with the gear 25 by a pair of rollers 27 and 28. Rollers 27 and 28 are each rotatably supported on a pair of pins 29, extending from the bottom of the case 2. At its upper end, the pin 24 is provided with a shouldered section 24a, of reduced cross-section, for supporting the pointer 15. On opposite sides of the pointer 15 and coaxial with the section 24a is a pair of washers 23c and 23d. Between the washer 23c and the bottom of the pointer 15, and coaxial with the section 24a, is a spring 23e. Spring 23e is provided for resiliently biasing the pointer 15 against the washer 23d. The washer 23d is, in turn, secured against moving axially by the lens 10, which is provided with a hole for receiving the upper end of the section 24a. The lens 10 is sealed to the case 2 on a shoulder 39 in any suitable manner. Below and interior of the shoulder 39 is a shoulder 36 for supporting the faceplate 11 immediately below the pointers 14 and 15.

As shown in FIG. 2-6, the rack 26 is a generally cylindircal member having a shouldered section 26a of reduced cross-section at its interior end, and an exterior end 26b having a recess 26c. Intermediate the ends 26a and 26b is a section 26d of reduced cross-section, in which is provided a plurality of teeth for engaging the gear 25. Opposite the end 26a in the wall of the case 2 is a shouldered support member 32. The support member 32 and the shouldered end 26a are provided for retaining a spring member 31 for biasing the rack 26 outwardly of the member 32.

The end of the rack 26b is adapted to project into a bore 35 in a wall of the case 2, as shown possibly more clearly in FIG. 6. Fitted over the end 26b is a flexible cup-shaped diaphragm 36 having a radially extending flange portion 36a. At the periphery of the flange portion 36a, there is provided an annular raised sealing ring 36b. Ring 36b is provided for insertion in a corresponding ring-receiving cavity 37 provided in the wall of the bore 35. In the center of the diaphragm 36 is a nipple 36c. Nipple 36c is provided for insertion in the recess 26c in the end 26b of the rack 26, and serves to center the diaphragm 36 relative to the rack 26. Preferably the diaphragm 36 is a rolling diaphragm of a wire or plastic mesh reinforced construction such as that sold by the Bellofram Corporation of Burlington, Mass. More specifically, the rolling diaphragm is preferred because it is typically responsive to extremely small pressure changes, has no appreciable spring gradient within a predetermined range of stroke, no break-out friction effects, possesses very low hysteresis qualities, is capable of extremely long strokes, and yet has a long flex life. For these reasons, it is possible to provide a pressure gauge according to the present invention without the need for delicate, sophisticated and expensive mechanical amplifying devices as is presently required in most gauges using Bourdon Tubes.

Fitted in the bore 35 for retaining the diaphragm 36 and forming a seal between the diaphragm 36 and the case 2 is the insert 16. The insert 16 generally conforms to the shape of the bore 35. At its interior it is provided with an annular wall member 16a. Outwardly of the wall member 16a and extending about the member is a shoulder 16b for retaining an O-ring 38. Generally centrally located in the insert 16 is the plurality of holes 16c.

In use, water is admitted through the holes 16c to the diaphragm 36. If the pressure interior of the diaphragm is less than the water pressure, the diaphragm flexes inwardly, moving the rack 26 inwardly against the spring 31. As the rack 26 moves, the gear 25 is rotated, rotating the shaft 23 and pointers 14 and 15.

Referring to FIGS. 3-5, the pointer 15 is provided at its outer end with a downwardly depending member 15a. Member 15a is provided for engaging the pointer 14 as the pointer 14 is moved in a direction of increasing pressure.

Recalling that pointer 15 is biased against the washer 23d by the spring 23e, it will be appreciated that, after pointer 14 has reached its maximum deflection and has begun to move counter-clockwise, the pointer 15 will remain at the point of maximum deflection of the pointer 14 and thereby provide an indication of the maximum depth achieved.

For resetting the pointer 15, the pointer is made of a magnetically responsive material, and a magnet carried by the diver is passed over the pointer to return it to its initial position.

A particular embodiment of a gauge according to the present invention has been described in terms of a type of portable gauge suitable for use in measuring depth of water. It is intended, however, that this description be considered only as illustrative of the invention and that various changes in the structure and materials could be made without departing from the spirit and scope of the invention. For example, the gauge, by reducing the interior pressure to less than one atmosphere, could be used for measuring altitude. Altitude could also be measured without a reduction of internal pressure if the biasing of the rack was reversed and the rack permitted to move outwardly against a spring pressure with increasing altitude.

For these reasons, it is intended that the scope of the invention be determined, not by the above description, but rather, by reference to the claims hereinafter provided.

What is claimed is:

1. A pressure gauge comprising:
    means forming a housing having a bore through one wall and including a compressible medium;
    a pointing means;
    means forming a faceplate for bearing indicia;
    a rack-and-pinion gear assembly having a rack and a gear for rotating said pointing means relative to said indicia as said rack is moved;
    means forming a flexible rolling diaphragm having no appreciable spring gradient within a predetermined range of stroke, said diaphragm being disposed to lie in contact with one end of said rack in said bore and being movable under the influence of a pressure differential between the interior of said housing and ambient pressure for moving said rack with no appreciable stretching of the material of which said diaphragm is made throughout said stroke;
    means for sealing said diaphragm in said bore; and
    means for returning said rack and said pointing means to an initial position upon the removal of said pressure differential from said diaphragm.

2. A gauge according to claim 1 wherein said pointing means comprises a pointer and further comprising secondary pointing means which moves with said pointer as said pointer is moved in a direction of increasing pressure differential, and remains at a fixed position as said pointer is moved therefrom in a direction of decreasing pressure differential, for indicating the maximum pressure differential sensed.

3. A gauge according to claim 2 wherein said maximum pressure differential indicating means is responsive to a magnetic field for resetting said indicating means.

4. A gauge according to claim 1 wherein said housing is cylindrically shaped and is provided with a bottom surface having a contour corresponding to the contour of rhe upper part of a wrist and a plurality of connecting members extending therefrom for connecting to a wristband.

5. A gauge according to claim 1 wherein said rack-and-pinion gear assembly further comprises a roller means in rolling contact with said rack for maintaining said rack in contact with said rack gear; and said returning means comprises a spring means.

6. A gauge according to claim 1 wherein said sealing means comprises means for sealing said diaphragm in a watertight manner so that said gauge may be used for measuring depth of water.

7. A diver's depth gauge for measuring depth of water comprising:
   means forming a housing having a bore through one wall and including a compressible medium;
   a pointing means;
   means forming a faceplate for bearing indicia;
   a rack-and-pinion gear assembly having a rack and a gear for rotating said pointing means relative to said indicia as said rack is moved;
   means forming a flexible rolling diaphragm having no appreciable spring gradient within a predetermined range of stroke, said diaphragm being disposed to lie in contact with one end of said rack in said bore and being movable under the influence of a pressure differential between the interior of said housing and ambient pressure for moving said rack with no appreciable stretching of the material of which said diaphragm is made throughout said stroke;
   means for sealing said diaphragm in said bore, said sealing means including water entry holes for permitting water pressure to be exerted on the exterior surface of said diaphragm, said water pressure serving to provide said ambient pressure; and
   means for returning said rack and said pointing means to an initial position upon the removal of said pressure differential from said diaphragm.

8. A gauge according to claim 7 wherein said pointing means comprises a pointer and further comprising secondary pointing means which moves with said pointer as said pointer is moved in a direction of increasing pressure differential, and remains at a fixed position as said pointer is moved therefrom in a direction of decreasing differential, for indicating the maximum pressure differential sensed.

9. A gauge according to claim 7 wherein said housing is cylindrically shaped and is provided with a bottom surface having a contour corresponding to the contour of the upper part of a wrist and a plurality of connecting members extending therefrom for connecting to a wristband.

10. A gauge according to claim 7 wherein said returning means is a spring means having a spring gradient and said rack, when moved, is moved in a straight line against the force of said spring means by an amount proportional to the ambient pressure and said spring gradient for moving said pointer.

* * * * *